(12) United States Patent
Ray

(10) Patent No.: US 8,767,930 B2
(45) Date of Patent: Jul. 1, 2014

(54) SYSTEM AND METHOD FOR AMPLIFYING ATTENUATED DTMF SIGNALS IN A PACKET BASED NETWORK

(75) Inventor: Amar N. Ray, Shawnee, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1921 days.

(21) Appl. No.: 11/824,185

(22) Filed: Jun. 29, 2007

(65) Prior Publication Data

US 2008/0304652 A1 Dec. 11, 2008

Related U.S. Application Data

(63) Continuation-in-part of application No. 11/810,629, filed on Jun. 6, 2007.

(51) Int. Cl.
H04M 1/56 (2006.01)
H04M 15/06 (2006.01)
H04M 7/12 (2006.01)

(52) U.S. Cl.
CPC ................................. H04M 7/1295 (2013.01)
USPC ........................ 379/142.18; 379/386; 379/347

(58) Field of Classification Search
CPC .................................................. H04M 7/1295
USPC ..................................... 379/386, 347, 142.18
See application file for complete search history.

(56) References Cited

U.S. PATENT DOCUMENTS

| | | | |
|---|---|---|---|
| 4,313,038 A * | 1/1982 | Nilssen et al. ................ | 379/283 |
| 4,475,013 A | 10/1984 | Lee et al. | |
| 4,558,188 A | 12/1985 | Stuparits et al. | |
| 4,924,497 A | 5/1990 | Smith et al. | |
| 5,128,991 A | 7/1992 | Murata | |
| 5,495,527 A | 2/1996 | Rollhaus et al. | |
| 5,825,871 A * | 10/1998 | Mark ........................ | 379/357.03 |
| 5,960,072 A | 9/1999 | Hird et al. | |
| 6,463,138 B1 | 10/2002 | Sherwood et al. | |
| 6,961,424 B1 * | 11/2005 | Vialle et al. ................... | 379/418 |

(Continued)

FOREIGN PATENT DOCUMENTS

JP 2008017538 A 1/2008

OTHER PUBLICATIONS

Telstra Corporation, Telstra T1000S User Guide; Copyright 2003; 3 pages.
U.S. Appl. No. 11/981,065; Final Rejection dated Mar. 30, 2012: 21 pages.

(Continued)

Primary Examiner — Alexander Jamal
(74) Attorney, Agent, or Firm — Swanson & Bratschun, L.L.C.

(57) ABSTRACT

A network interface device may include an I/O unit configured to receive data packets from a packet network. A processing unit may be in communication with the I/O unit and be configured to identify data packets including data representative of DTMF signals, convert the data in the data packets into analog DTMF tone signals, and determine if power of the analog DTMF tone signals is below a threshold value. A digital to analog converter may be in communication with the processing unit and be configured to generate the analog DTMF tone signals based on the data in the data packets. A DTMF amplifier may be in communication with the processing unit and the digital to analog converter, where the processing unit may cause the DTMF amplifier to amplify the power of the analog DTMF tone signals in response to determining that the power of the analog DTMF tone signals are below the threshold value.

20 Claims, 5 Drawing Sheets

(56) References Cited

U.S. PATENT DOCUMENTS

| | | |
|---|---|---|
| 7,088,276 B1 | 8/2006 | Wegener |
| 7,180,892 B1* | 2/2007 | Tackin ............... 370/389 |
| 8,014,341 B1* | 9/2011 | Ray .................. 370/328 |
| 8,335,308 B2 | 12/2012 | Ray |
| 2002/0090042 A1* | 7/2002 | Heinonen et al. ......... 375/345 |
| 2002/0118824 A1 | 8/2002 | Yun |
| 2002/0146112 A1 | 10/2002 | Larson et al. |
| 2003/0194075 A1 | 10/2003 | McGrath et al. |
| 2004/0001586 A1* | 1/2004 | Melsa et al. ......... 379/399.01 |
| 2004/0162111 A1 | 8/2004 | Kim |
| 2006/0106602 A1 | 5/2006 | Caldwell et al. |
| 2006/0171521 A1 | 8/2006 | Allen et al. |
| 2007/0291916 A1* | 12/2007 | Oblad ................ 379/159 |
| 2008/0304651 A1 | 12/2008 | Ray |
| 2009/0110183 A1 | 4/2009 | Ray |

OTHER PUBLICATIONS

U.S. Appl. No. 11/981,065; Non-Final Rejection dated Aug. 15, 2011; 13 pages.

U.S. Appl. No. 11/810,629; Final Rejection dated Jul. 21, 2011; 15 pages.

U.S. Appl. No. 11/810,629; Non-Final Rejection dated Jan. 24, 2011; 13 pages.

U.S. Appl. No. 11/981,065; Notice of Allowance dated Sep. 7, 2012; 17 pages.

U.S. Appl. No. 11/810,629; Non Final Rejection dated Nov. 23, 2012; 19 pages.

U.S. Appl. No. 11/981,065; Issue Notification dated Nov. 28, 2012; 1 page.

U.S. Appl. No. 11/810,629; Final Rejection dated Jun. 19, 2013; 21 pages.

* cited by examiner

SYSTEM AND METHOD FOR AMPLIFYING ATTENUATED DTMF SIGNALS IN A PACKET BASED NETWORK

RELATED APPLICATIONS

This application is a Continuation-in-Part of U.S. patent application Ser. No. 11/810,629 filed on Jun. 6, 2007, (hereinafter, "the '629 application"), the entire contents of which are hereby incorporated by reference.

BACKGROUND

Telephony has been rapidly changing in recent years. With the development and growth of the Internet and other packet-based network types, communications carriers have been developing networks that either extend from the public switched telephone network (PSTN) or operate independent from the PSTN.

Remotely accessed telecommunications systems, such as voicemail, interactive voice response (IVR) systems, and interactive keypad response systems, generally use DTMF signals to enable a user to interact these systems. The remotely accessed telecommunications systems generally operate by recognizing and responding to DTMF signals having amplitudes with a certain power level range.

As new packet-based networks have been developing, additional equipment has been developed to interface telephones to the networks and the networks with each other. In addition, the packet networks tend to be smaller, which results in more network-to-network interfaces (NNI) being used.

As understood in the art, communications signals naturally attenuate when communicated through devices and over transmission lines. The amount of attenuation of communications signals is generally known for different types of network devices and networks. It is further known that attenuation results from an digital-to-analog (D/A) process at different end-point network adapters and converters. For example, an integrated access device, which is a customer premises device that provides access wide area network and the Internet, aggregates multiple channels of information, including voice and data, across a single shared link to a carrier or service provider uses D/A converts to convert DTMF signals being communicated in data packets into analog DTMF signals.

FIG. 1 is an illustration of an exemplary network 100 composed of a PSTN 102, voice over broadband (VoBB) IP networks 104a-104c (collectively 104), and voice over Internet protocol (VoIP) peering network 106. Communications may be performed between the PSTN 102 and VoBB IP network 104 via media gateways 108a-108c (collectively 108). Communications between each of the sub-networks 104 and 106 are performed via session border controllers 110a-110c (collectively 110). As shown, communications between telephones may pass through the PSTN network 102 or avoid the PSTN network 102 by being routed directly to packet networks 104 and 106. Four exemplary call paths are shown in FIG. 1, including calls paths 1, 2, 3, and 4.

Call path 1 is a traditional call path that is established between a first telephone 112 that communicates via an access network 114 from the telephone 112 via a class 5 switch 116. The class 5 switch 116 routes the call via the PSTN network 102 to class 5 switch 118 via access network 119 to a receiving telephone 120. Call path 1 is considered a conventional call over the PSTN network 102 on plain old telephone (POTS) networks.

Call path 2 is shown to traverse via the access network 114, class 5 switch 116, and PSTN network 102. Call path 2 further is established over media gateway 108b to the VoBB IP network 104b via the Internet access device (IAD) 122 to telephone 124. Call path 3 is routed from the telephone 112 via the access network 114 and class 5 switch 116 to a border control switch (BCS) 126 to communicate via the VoIP peering network 106. From the VoIP peering network 106, the call path continues through session border controller 110b to the VoBB IP network 104b and via the IAD 122 to telephone 124.

In the case where a packet-based telephone 128 places a call to another packet-based telephone 124, call path 4, which passes through IAD 130 to VoBB IP network 104a. From the VoBB IP network 104a, call path 4 continues through SBC 110a, VoIP peering network 106, SBC 110b, VoBB IP network 104b, and IAD 122 to telephone 124.

With the traditional call path 1, each element over which the call path 1 is established has a known attenuation value. If a minimum low frequency component level starts at −10 dBm (low current=long loop), add about 7 dB loss (i.e., −7 dB) for each of 2 long loops, and include a 6 dB receive loss pad in the far end CO, the low frequency component power level is computed as −10−2×7−6=−30 dBm The corresponding calculation for the high frequency component starts with a level of −8 dBm and includes an additional −4 dB twist for each loop, so the high frequency component power level is computed as −8−2×7−2×4−6=−36 dBm. For example, at the telephone 112, the low frequency DTMF component level is −10 dBm, access network 114 may have an attenuation of 7 dB, assuming no attenuation through class 5 switch 116, far end class 5 switch 118 has an attenuation (receive loss pad) of 6 dB, and access network 119 has an attenuation of 7 dB. In total, the attenuation of call path 1 is 20 dB for low frequency DTMF signal (i.e., a power level that is −20 dB below the DTMF signal power generated by the telephone). Therefore, the low frequency DTMF component power level at the far end telephone system may be −30 dBm.

The far end telephone system needs to recognize this low power level (−30 dBm), low frequency DTMF component for making an appropriate response. For the same path, the attenuation for the high frequency DTMF component of signal level −8 dBm turns out to be 28 dB (−2×7−2×4−6=−28 dB) including an additional −4 dB twist for each loop (i.e., the far end telephone system needs to recognize this low level (−8 dBm−28 dB=−36 dBm), high frequency DTMF component power level for making an appropriate response). It is to be noted that in traditional network the levels of minimum low and high frequency DTMF signals received at the CO are −17 dBm and −19 dBm respectively with an attenuation of maximum −7 dB and −1 dB respectively. A DTMF signal that is attenuated by 20 dB to 28 dB may cause the remotely accessed telecommunications system to not receive DTMF signal inputs from the telephone to the remotely accessed telecommunications system properly. The other call paths, call paths 2, 3, and 4, pass over media gateways, broadband networks, IP networks, border control switches, Internet access devices, session border controllers, etc. Each of these network components have a range of attenuation that results from a signal passing through the respective network devices. For example, in addition to the amount of attenuation as stated above the broadband networks (e.g., VoBB IP network 104a) has an attenuation of 5 dB, central office (not shown) has an attenuation of 6 dB, media gateways have an attenuation of 6 dB, and integrated access devices have an attenuation of 6 dB. Each of these attenuations is a minimum value and the attenuation may have additional attenuation of a few dB. Because communications over multiple packet networks may occur, attenuation that is higher than conventional calls being placed over the PSTN network 102 may result. For example, if a telephone call is placed from a telephone and passes over multiple packet networks, such as call path 3, then attenuation resulting from the call being placed over multiple devices and multiple packet networks cause signals communicated over the call path to be attenuated by the sum of each of the attenuations of the network devices and networks over which the call path traverses. It is not uncommon that an attenuation of 30 dB or higher (i.e., −30 dB below the initial signal) occurs when a communication path crosses multiple packet networks.

As a result of higher attenuation occurring when a telephone call is placed from a conventional telephone via the PSTN network 102 to telephones operating on packet networks, operation of DTMF signals may be affected due to the attenuation of the high and low frequencies of the DTMF signals being attenuated below operational standards of remotely accessed telecommunications systems. For example, if a remotely accessed telecommunications system expects to receive DTMF signals with a minimum power level or amplitude of −38 dBm, a signal that is attenuated by 28 dB or higher may cause the remotely accessed telecommunications system to not receive DTMF signal inputs from the telephone to the remotely accessed telecommunications system properly. As more and more packet networks are established and integrated for use by telecommunications, higher levels of attenuation currently cause and are expected to cause more problems for users of telephones attempting to access remotely accessed telecommunications systems. For example, if a caller from India were to call a voicemail system in the United States, the voicemail system may be incapable of responding to DTMF signals from the caller in India due to the DTMF signals being attenuated to the point that the voicemail system cannot determine the DTMF signals being entered by a user pressing buttons on his or her telephone in India. What is needed is a way for DTMF signals traversing packet networks and network devices enable users to interface with remotely accessed telecommunications systems.

SUMMARY

To overcome the problems of DTMF signals being attenuated by network nodes and packet networks to the point of not being able to communicate with remotely accessed telecommunications systems, the principles of the present invention provide for end-point adapters to determine a power level of analog DTMF signals converted from data packets communicating the DTMF signals in data packets and determine if the power level is below a threshold power level. In one embodiment, the power level is set at a lower level of the TIA-470.230-C specification. The power level used for determining if the power level is below the threshold power level may be the maximum, minimum, or average power level.

An embodiment of a network interface device may include an I/O unit configured to receive data packets from a packet network. A processing unit may be in communication with the I/O unit and be configured to identify data packets including data representative of DTMF signals, convert the data in the data packets into analog DTMF tone signals, and determine if power of the analog DTMF tone signals is below a threshold value. A digital to analog converter may be in communication with the processing unit and be configured to generate the analog DTMF tone signals based on the data in the data packets. A DTMF amplifier may be in communication with the processing unit and the digital to analog converter, where the processing unit may cause the DTMF amplifier to amplify the power of the analog DTMF tone signals in response to determining that the power of the analog DTMF tone signals are below the threshold value.

An embodiment of a method for communicating DTMF signals over a packet network may include identifying data packets received via a packet network, where the data packets include data representative of DTMF signals. The data in the data packets may be converted into analog DTMF tone signals. A determination if power of the analog DTMF tone signals is below a threshold value may be made. Analog DTMF tone signals may be generated based on the data in the data packets. The power of analog DTMF analog tone signals may be amplified in response to determining that the power of the analog DTMF tone signals are below the threshold value.

BRIEF DESCRIPTION OF THE DRAWINGS

Illustrative embodiments are described in detail below with reference to the attached drawing figures, which are incorporated by reference herein and wherein.

DETAILED DESCRIPTION OF THE DRAWINGS

Figure 1:
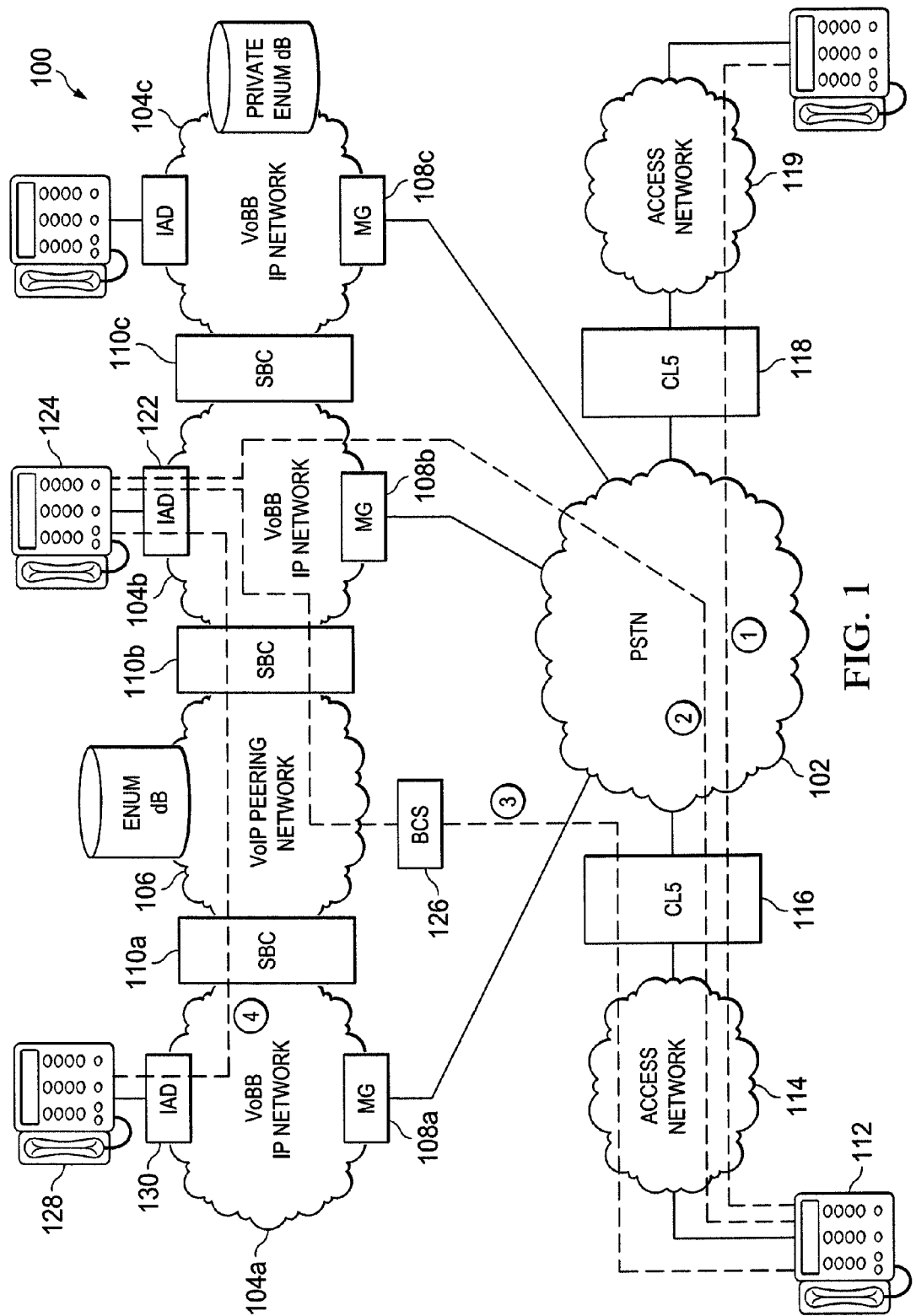
FIG. 1 is an illustration of an exemplary network including sub-networks for communicating telephone calls between end-users.
Figure 2:
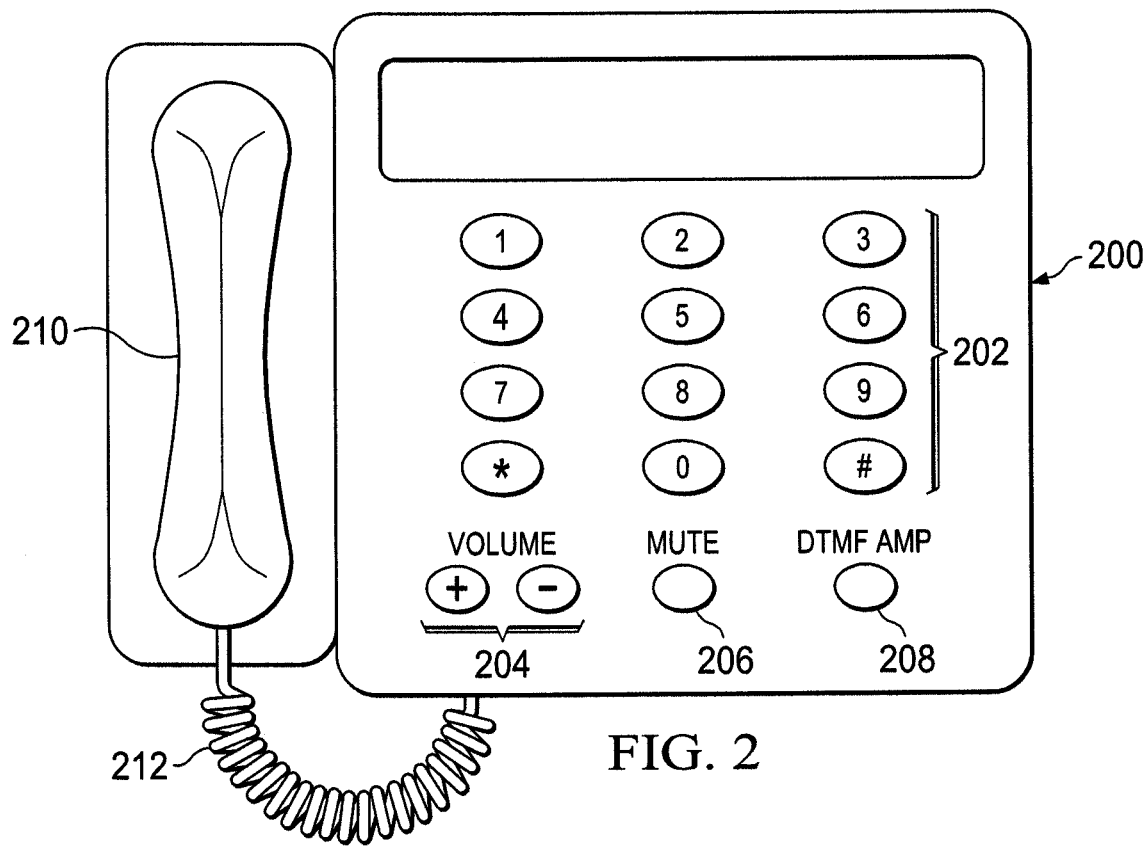
FIG. 2 is an illustration of an exemplary telephone for use in communicating DTMF signals with and without amplification.

FIG. 2 is an illustration of an exemplary telephone 200 for use in communicating DTMF signals with and without amplification. The telephone 200 may include a keypad 202 that enables a user to dial telephone numbers and interact with remotely accessed telecommunications systems by pressing keys to generate DTMF signals for interacting with the remotely accessed telecommunications systems. In addition to conventional keys or buttons, such as volume control 204 and mute 206, a DTMF amplification key or button 208 may be included on the telephone 202 as specified in the '629 application. The DTMF amplification key 208 is a "hard-button" that causes the telephone 200 to amplify DTMF signals for communication over a network. By amplifying the DTMF signals, the telephone 200 may interact with remotely accessed telecommunications systems if attenuation over a call path is such that a remotely accessed telecommunications system may not be able to identify DTMF signals communicated from the telephone 200. Although shown as a button located on the face of the telephone, it should be understood that any other DTMF amplification selector may be provided on the telephone 200 or handset 210. For example, a gain adjustment mechanism that may be selectable by a user may include a hard-button, key, knob, switch, rotary mechanism, or any other mechanism located anywhere on the telephone 200, handset 210, or cord (e.g., cord 212) connected to the telephone 210 that enables a user to selectively amplify DTMF signals generated by the telephone 200 for communication over a network.

Figure 3:
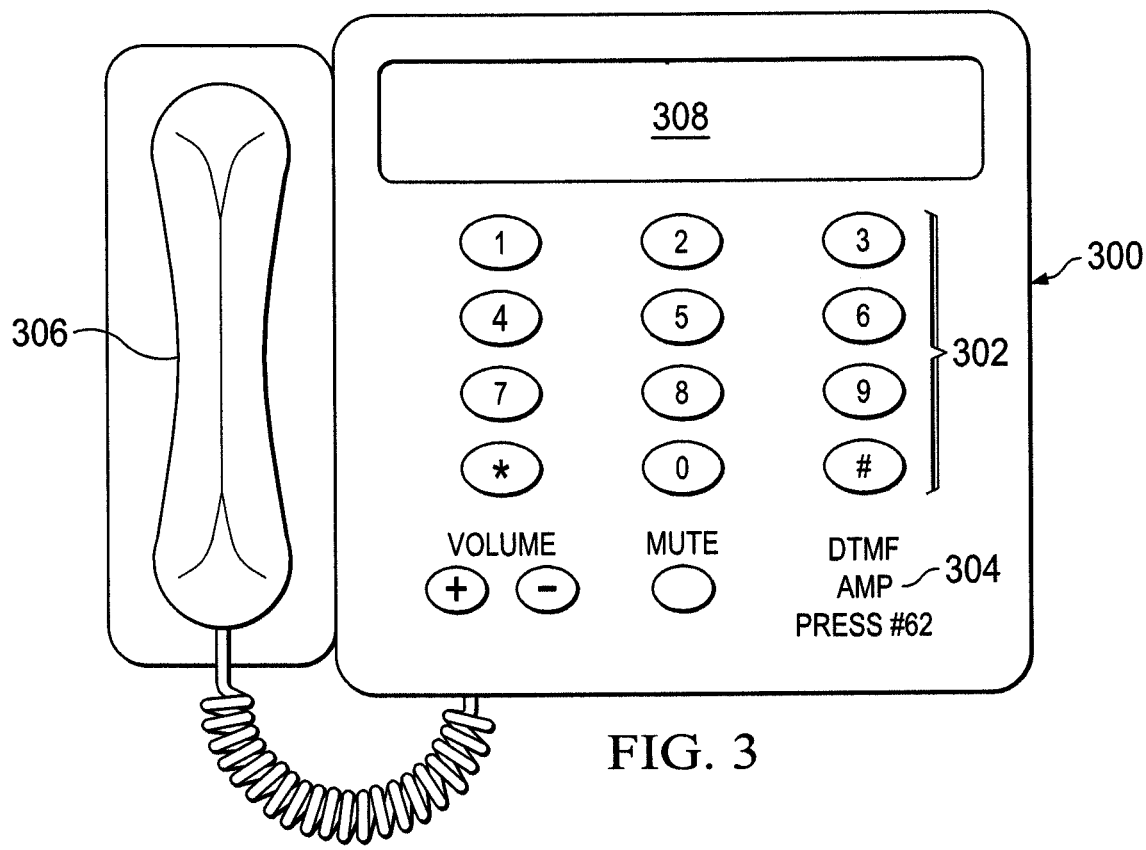
FIG. 3 is an illustration of another exemplary embodiment of a telephone for communicating DTMF signals with and without amplification.

FIG. 3 is an illustration of another exemplary embodiment of a telephone 300 for communicating DTMF signals with and without amplification as specified in the '629 application. The telephone 300 may include a keypad 302. Rather than having a hard-button, push button, or other independent selection mechanism for changing or otherwise increasing the gain of DTMF signals for communication over a network the telephone 300 may enable a user to enter a code or sequence of keys, such as "*62," to cause the telephone 300 to amplify the DTMF signals. Indicia 304 may be printed on the telephone 300 to notify the user of the key sequence to operate the DTMF amplification feature. The telephone 300 may use software, hardware, or firmware to recognize that the key sequence is pressed and cause the telephone 300 to amplify DTMF signals for the duration of the telephone call. In one embodiment, the telephones 200 (FIG. 2) and 300 may amplify the DTMF signals by a fixed amount, such as 10 dB, increase amplification of the DTMF signals in steps, such as step increases of 2 dB, or variable amounts in a more analog fashion. In one embodiment, indication of the amplification of the DTMF signals may be communicated to the user by increasing volume of DTMF signals via a speaker (not shown) in the handset 306 of telephone 300. The volume increase may or may not match the actual amplification increase of the DTMF signal to avoid damaging the speaker. Other indicators such as a single tone, light on the telephone, indicia on a display 308, or otherwise, may be used to notify the user that the DTMF signals are being amplified.

Figure 4:
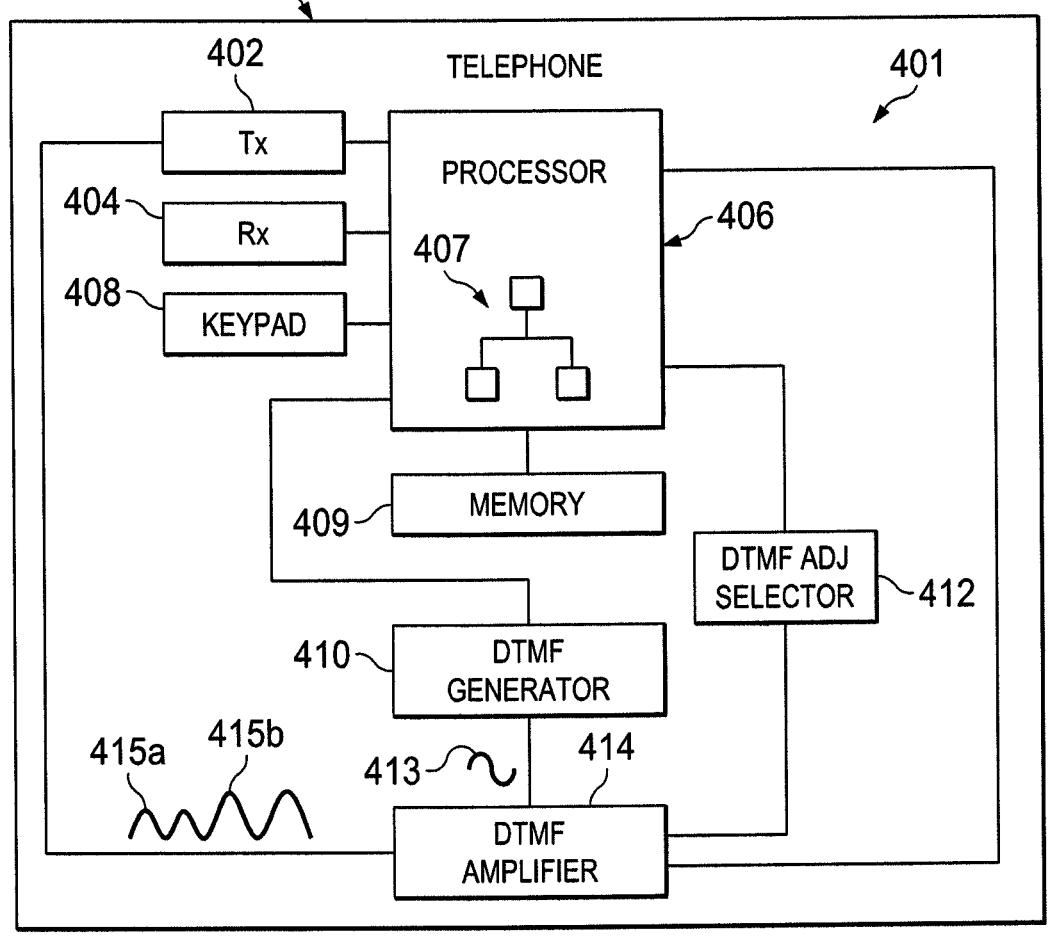
FIG. 4 is a block diagram of an exemplary schematic of a telephone for generating and communicating DTMF signals with and without amplification as described in the '629 application.

FIG. 4 is a block diagram of an exemplary schematic 401 of a telephone 400 for generating and communicating DTMF signals with and without amplification. The telephone 400 may include a transmitter 402 and receiver 404. The transmitter 402 may be used for transmitting signals, including voice, data, and DTMF signals, and receiver 404 may be used for receiving signals, such as voice, data, and DTMF signals. In one embodiment, the transmitter 402 and receiver 404 are integrated into a transceiver, as understood in the art. A processor 406 may be in communication with the transmitter 402 and receiver 404 and execute software 407 to operate the telephone 400 in accordance with the principles specified in the '629 application. In one embodiment, the software is configured to receive a signal from a user selecting or otherwise inputting a DTMF amplification request by pressing a hard-button or entering a code using a keypad 408 on the telephone 400.

The telephone 400 may include memory 409 that is in communication with the processor 406 for storing information, such as speed dial telephone numbers, other conventional information, and, optionally, one or more amplification levels for use in amplifying DTMF signals in accordance with the principles specified in the '629 application.

A DTMF signal generator module 410 may be used for generating DTMF signals in response to a user pressing keys on a keypad of the telephone 400. A DTMF adjustment module 412 may determine that a user has selectively requested that DTMF signals be amplified or otherwise increased. A DTMF amplifier module 414 may receive DTMF signals 413 from the DTMF generator module 410 and, if the DTMF adjustment selection module 412 has determined that the user has requested that DTMF signals be amplified, amplify the DTMF signals 413. In one embodiment, the DTMF signals 413 are amplified by a constant amplification, such as 10 dB.

Although shown as separate modules, the DTMF generator module 410, DTMF adjustment selection module 412, and DTMF amplifier module 414 may be part of the software 407 executed by the processor 406. Alternatively, and as shown, each of the modules 410, 412, and 414 may be hardware. Still yet, the modules may be firmware. While shown as separate modules, it should be understood that these modules may be incorporated into one or more modules and perform the same or similar functionality as described herein. It should be further understood that the term "module" does not limit a function to be independent of other functions and that the functions for performing the functionality for generating DTMF signals, adjusting DTMF signals, and amplifying DTMF signals may be integrated into a single hardware, software, or firmware module.

Although shown as a separate module, the DTMF adjustment selection module 412 may be any function that causes the DTMF amplifier to be activated to amplify the DTMF signals 413 from a non-amplified DTMF signal 415a into an amplified DTMF signal 415b. For example, the DTMF adjustment module may include a switch that is thrown in response to a user selecting to amplify DTMF signals, thereby causing the DTMF amplifier module 414 to amplify the DTMF signals during the remainder of the telephone call. The DTMF adjustment selection module 412 may disable amplification until a call is established. The DTMF amplifier module 414 may operate in two or more amplification levels, including amplification having a scale factor of one and amplification having a scale factor of any value that causes a DTMF signal to be amplified or otherwise increased. In one embodiment, the amplification is 10 dB. Amplification of the DTMF signals, for the purposes of the principles specified in the '629 application, may be considered any function that causes the DTMF signals 413 to be increased by any predetermined power level, such as 10 dB. It should be understood that the schematic shown herein is exemplary and that any other configuration that enables the telephone 400 to operate in accordance with the principles of the present invention may be utilized.

Figure 5:
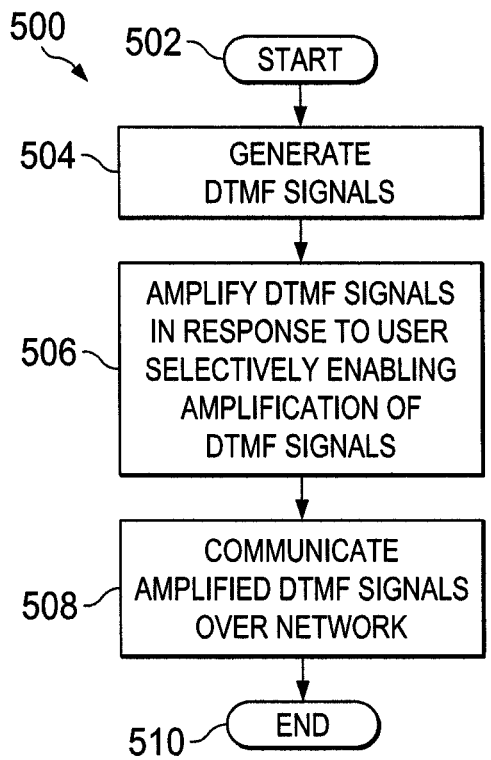
FIG. 5 is a flow chart of an exemplary alternate process for communicating DTMF signals with amplification in accordance with the principles described in the '629 application.

FIG. 5 is a flow chart of an exemplary process 500 for communicating DTMF signals with amplification in accordance with an illustrative embodiment described in the '629 application. The process 500 starts at step 502. At step 504, DTMF signals are generated. At step 506, the DTMF signals are amplified in response to a user selectively enabling amplification of the DTMF signals. Again, amplification may mean any function that causes the DTMF signals to be increased in gain, power, or amplitude. At step 508, the amplified DTMF signals are communicated over a network It should be understood that the network may include one or more networks over which a call path is established between a telephone and remotely accessed telecommunications system. The process 500 ends at step 510.

Figure 6:
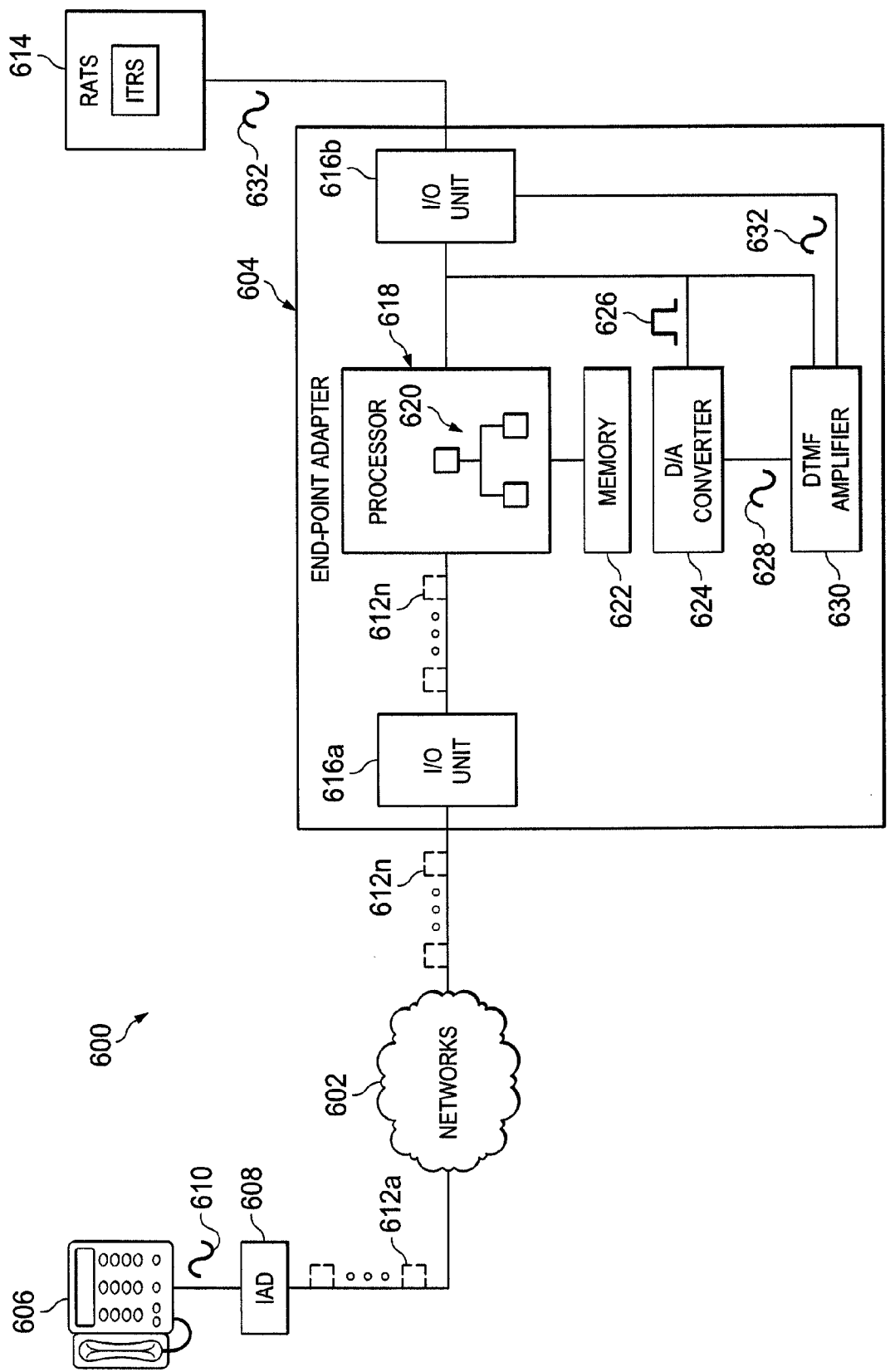
FIG. 6 is a block diagram of an exemplary end-point adapter configured to amplify power of DTMF signals.

FIG. 6 is a block diagram of a communications system 600 including one or more packet networks 602 and an exemplary end-point adapter 604 configured to amplify power of DTMF signals in accordance with an illustrative embodiment. The communications system 600 may include a telephone 606 in communication with and end-point adapter 608, such as an integrated access device. The end-point adapter 608 is connected to one of the packet network(s) 602 and configured to convert DTFM signals 610 communicated from the telephone 606 into data packets 612a for communication over the packet network(s) 602. Power of the data packets 612a may be attenuated into attenuated data packets 612n as the data packets 612a are communicated over the packet network(s) 602 due to passing through D/A and A/D converters and over the network(s) 602. The attenuated data packets 612n may be received by the end-point adapter 604 and processed for communication to remotely accessed telecommunications system (RATS) 614 that operates an interactive telephone response system, such as a telephone answering machine system (TAMS).

The end-point adapter 604 may include a network side input/output (I/O) unit 616a and remotely accessed telecommunications system side I/O unit 616b, where the I/O unit 616a may receive the data packets 612n. It should be understood that the I/O units 616a and 616b may be configured as a single I/O unit. A processing unit 618 may be in communication with the I/O units 616a and 616b and be configured to execute software 620 that is configured to depacketize the data packets 612n. The processing unit 618 may include one or more processors that may include general processor(s) or digital signal processor(s). A memory 622 may be in communication with the processing unit 618 and be utilized to store data while the processing unit 618 is processing data packets 612n. A digital to analog converter 624 may receive data 626 representative of DTMF signals communicated in the data packets 612n and be utilized to generate analog DTMF tone signals 628. It should be understood that while the digital to analog converter 624 and DTMF amplifier 630 are shown to be separate from the processing unit 618, one or both of these functions may alternatively be incorporated into the processing unit 618.

In operation, the software 620 may cause the processing unit 618 to cause the DTMF amplifier 630 to amplify DTMF analog signals 628 generated by the digital to analog converter 624 to produce amplified DTMF analog signals 632. In one embodiment, the software 620 may use a threshold level and determine whether power of the DTMF analog signals 628 are below the threshold level and, if so, cause the DTMF amplifier 630 to amplify the DTMF analog signals 628. If, however, the analog DTMF tone signals 628 are not below the threshold level, then the DTMF amplifier may amplify the DTMF analog signals 628 by a scale factor of 1.0, which, as understood in the art, does not amplify the DTMF analog signals 628. Rather than using the DTMF analog signals 628 to determine whether amplification should be applied, the processing unit 618 may use the data 626 received in the data packets 612n. The threshold level may be set to a minimum power threshold level defined in TIA/EIA-470.230-C standard. If the processing unit 618 determines that the power of the DTMF analog signals 628 are below the threshold level, then the DTMF amplifier 630 may amplify the DTMF analog signals 628 at least a difference between the threshold level and the power level of the DTMF analog signals 628. In one embodiment, the power level is a minimum power level of the DTMF analog signals 628 as specified in TIA/EIA-470.230-C standard. Alternatively, the power level is a maximum power level of the DTMF analog signals 628 as specified in TIA/EIA-470.230-C standard. Still yet, the power level may be an average power level of the DTMF analog signals 628. These power levels may be over one or more DTMF tones.

Figure 7:
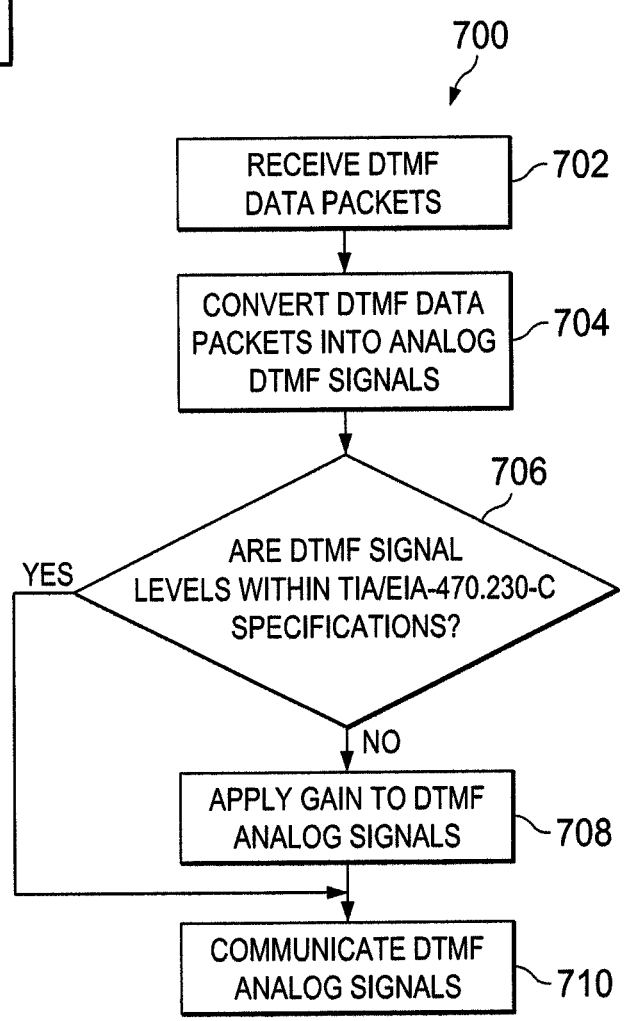
FIG. 7 is a flow diagram of an exemplary process for converting data packets including DTMF signals and amplifying power of DTMF signals below a threshold power level.

FIG. 7 is a flow diagram of an exemplary process 700 for converting data packets including DTMF signals and amplifying power of DTMF signals below a threshold power level. The process 700 starts at step 702, where DTMF data packets (i.e., data packets including data representative of DTMF tones) are received. At step 704, DTMF data packets are converted into analog DTMF signals. In one embodiment, the DTMF data in the DTMF data packets are converted as specified in international standard RFC 2833. At step 706, a determination is made as to whether power of the analog DTMF signals is within Telephone Industry of America (TIA) TIA/EIA-470.230-C specifications. More generally, the determination may be made to determine whether the power of the analog DTMF signals is below a threshold level representative of a low threshold at which the DTMF signals can be correctly identified by a device, such as an end-point network adapter. The power may be measured over a single DTMF tone or multiple DTMF tones, as further described above. It should be understood that the power may be a voltage level or any other parameter (e.g., current) associated with power. If the power of the analog DTMF signals is below the threshold level, then the process continues at step 708, where gain is applied to the analog DTMF signals. If the power of the analog DTMF signals is above the threshold level, then the process continues at step 710. Implementation of the process 700 may be performed by making appropriate changes to existing software and/or hardware inside an end-point network adapter, converter device, network interface device, or other device.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A network interface device, comprising:
an I/O unit configured to receive data packets from a packet network;
a processing unit in communication with said I/O unit and configured to identify data packets including data representative of DTMF signals;
a digital to analog converter in communication with said processing unit and configured to convert the data into analog DTMF tone signals and generate analog DTMF tone signals based on the data, and the processing unit further configured to determine if power of the analog DTMF tone signals is below a threshold value; and
a DTMF amplifier in communication with said processing unit and said digital to analog converter, said processing unit causing said DTMF amplifier to amplify the power of the analog DTMF tone signals in response to determining that the power of analog DTMF tone signals is below the threshold value.

2. The network interface device according to claim 1, wherein the threshold value is set at a low power DTMF threshold value as specified in the TIA-470.230-C standard.

3. The network interface device according to claim 1, wherein said processing unit is further configured to determine a difference in power level that the analog DTMF tone signals are below the threshold level by, and cause said DTMF amplifier to amplify the analog DTMF tone signals by at least the difference in power level.

4. The network interface device according to claim 1, wherein the data included in the data packets is for at least one of continuous DTMF signals and DTMF tone signals.

5. The network interface device according to claim 1, wherein said processing unit is configured to convert the data to the analog DTMF tone signals according to an RFC 2833 standard.

6. The network interface device according to claim 1, wherein said I/O unit is further in communication with a remotely accessed telecommunications system.

7. The network interface device according to claim 6, wherein the remotely accessed telecommunications system is an interactive telephone response system.

8. The network interface device according to claim 1, wherein the power of the analog DTMF tone signals is an average power.

9. The network interface device according to claim 8, wherein the average power is calculated over a single DTMF tone.

10. The network interface device according to claim 1, wherein the network interface device is an Internet access device.

11. A method for communicating DTMF signals over a packet network, said method comprising:
   identifying data packets received via a packet network, the data packets including data representative of DTMF signals;
   converting the data in the data packets into analog DTMF tone signals;
   determining if power of the analog DTMF tone signals is below a threshold value; and
   amplifying the power of the analog DTMF tone signals in response to determining that the power of the analog DTMF tone signals is below the threshold value.

12. The method according to claim 11, further comprising setting the threshold value at a low power DTMF threshold as specified in the TIA-470.230-C standard.

13. The method according to claim 11, further comprising determining a difference in power level that the analog DTMF tone signals are below the threshold level by, and cause the power of the analog DTMF tone signals to be amplified by at least the difference in power level.

14. The method according to claim 11, wherein identifying data packets including data representative of DTMF signals including identifying data packets including at least one of data representative of continuous DTMF signals and data representative of the DTMF tone signals.

15. The method according to claim 11, wherein converting the data to the analog DTMF tone signals includes converting the data to the analog DTMF tone signals according to an RFC 2833 standard.

16. The method according to claim 11, further comprising communicating the analog DTMF tone signals with a remotely accessed telecommunications system.

17. The method according to claim 16, wherein communicating the analog DTMF tone signals with the remotely accessed telecommunications system includes communicating the analog DTMF tone signals with an interactive telephone response system.

18. The method according to claim 11, wherein determining if power of the analog DTMF tone signals is below a threshold value includes determining if average power of the analog DTMF tone signals is below the threshold value.

19. The method according to claim 18, wherein determining if the average power of the analog DTMF tone signals is below the threshold value includes determining if the average power over a single DTMF tone is below the threshold value.

20. The method according to claim 11, further comprising receiving the data packets from the Internet.

* * * * *